United States Patent
Hsu et al.

(10) Patent No.: US 7,014,964 B1
(45) Date of Patent: Mar. 21, 2006

(54) COLOR FILTER SUBSTRATE AND FABRICATING METHOD THEREOF

(75) Inventors: Feng-Lin Hsu, Taipei (TW); Yu-Cheng Lo, Taipei (TW)

(73) Assignee: Chunghwa Picture Tubes, LTD., Taipei (TW)

( * ) Notice: Subject to any disclaimer, the term of this patent is extended or adjusted under 35 U.S.C. 154(b) by 0 days.

(21) Appl. No.: 10/904,751

(22) Filed: Nov. 25, 2004

(51) Int. Cl.
G02B 5/20 (2006.01)
G02F 1/1335 (2006.01)

(52) U.S. Cl. .................. 430/7; 427/162; 427/164; 427/270; 427/271

(58) Field of Classification Search .............. None
See application file for complete search history.

(56) References Cited

U.S. PATENT DOCUMENTS 6,042,974 A * 3/2000 Iwata et al. ............... 430/7
2003/0030055 A1* 2/2003 Nakano et al. ............ 257/72

FOREIGN PATENT DOCUMENTS

JP      11-326627 A  * 11/1999
JP      2003-167116 A  * 6/2005

* cited by examiner

*Primary Examiner*—John A. McPherson
(74) *Attorney, Agent, or Firm*—Jianq Chyun IP Office

(57) ABSTRACT

A color filter substrate comprising a substrate, a black matrix and a plurality of color filter patterns is provided. The black matrix is disposed on a rough surface of the substrate to define a plurality of sub-pixel regions. Each one of the color filter patterns is disposed in one of the sub-pixel region and touch the rough surface. When the color filter patterns are formed in the sub-pixel regions, the contacting area between the color filter patterns and the substrate is increased owing to the rough surface of the substrate. Thus, the adhesion between the color filter patterns and the substrate within the sub-pixel regions are enhanced.

13 Claims, 7 Drawing Sheets

COLOR FILTER SUBSTRATE AND FABRICATING METHOD THEREOF

BACKGROUND OF THE INVENTION

1. Field of the Invention

The present invention relates to a color filter substrate and a fabricating method thereof. More particularly, the present invention relates to a color filter substrate and a fabricating method thereof to enhance the adhesive reliability between the color filter patterns on the color filter substrate and the substrate within the sub-pixel regions.

2. Description of Related Art

At an age when the manufacturing technology of the flat display panel is highly developed, the flat display's advantages such as lightness, thinness, low radiation, low power consumption and its dropping price are deeply favored by the consumers.

The liquid crystal display products in the present market generally include color filter substrates for displaying colorful images. The fabricating process of color filter substrates usual includes the step of forming a black matrix on a substrate to define a plurality of sub-pixel regions on the substrate. Then, a color filter pattern is formed in each of the sub-pixel regions. Later, a planar layer and a common electrode thereon are formed one after another. Finally, an alignment layer is formed thereon.

In conventional art, the color filter patterns are distributed directly on the color filter substrates within the sub-pixel regions. However, the conventional method does not apply any process to enhance the adhesion between the color filter pattern and the substrate within the sub-pixel regions, which will result in peeling or cracking of the color filter patterns.

SUMMARY OF THE INVENTION

Accordingly, the present invention is directed to providing a color filter substrate and a fabricating method thereof, which can enhance the adhesion between the color filter pattern of the color filter substrate and the substrate within the sub-pixel regions.

According to an embodiment of the present invention, a color filter substrate comprising a substrate, a black matrix and a plurality of color filter patterns is provided. Wherein, the substrate has a rough surface. The black matrix is disposed on the substrate to define a plurality of sub-pixel regions. A plurality of color filter pattern is disposed in the sub-pixel regions respectively and touches the rough surface of the substrate.

According to another embodiment of the present invention, a fabricating method of color filter substrate is provided. The fabricating method of color filter substrate comprises the step of performing a roughening process on the surface of a substrate. Then, a black matrix is formed on the substrate to define a plurality of sub-pixel regions on the rough surface. Finally, a color filter pattern is formed in each of the sub-pixel regions.

According to still another embodiment of the present invention, a fabricating method of color filter substrate is provided. The fabricating method of color filter substrate comprises the step of forming a black matrix on a substrate to define a plurality of sub-pixel regions on the substrate. Then, a roughening process is performed in the sub-pixel regions of the substrate. Finally, a color filter pattern is formed in each of the sub-pixel regions.

Since the substrate in the present invention has a rough surface, the contacting area between the color filter pattern and the substrate within the sub-pixel regions can be increased. Therefore, the adhesion between the color filter pattern and the substrate within the sub-pixel regions can be enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The First Embodiment

Reference will now be made in detail to the present preferred embodiments of the invention, examples of which are illustrated in the accompanying drawings. Wherever possible, the same reference numbers are used in the drawings and the description to refer to the same or like parts.

Figure 1A:
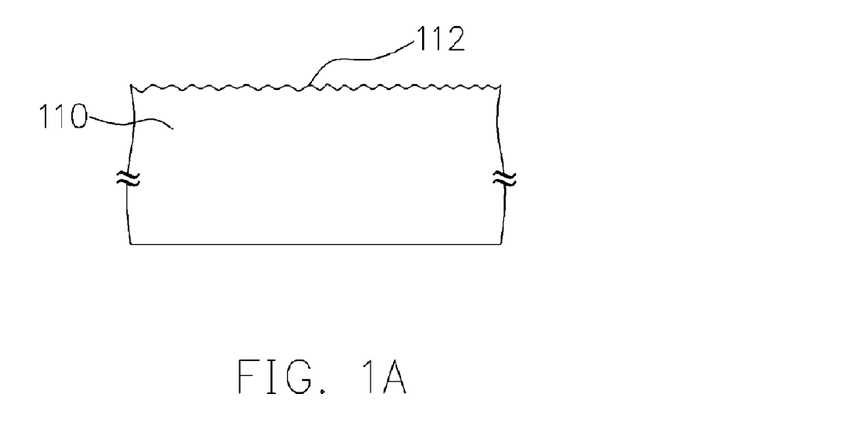
FIGS. 1A, 1B, and 1C are schematic cross-sectional views showing the steps of fabricating a color filter substrate according to one embodiment of the present invention.
Figure 1B:
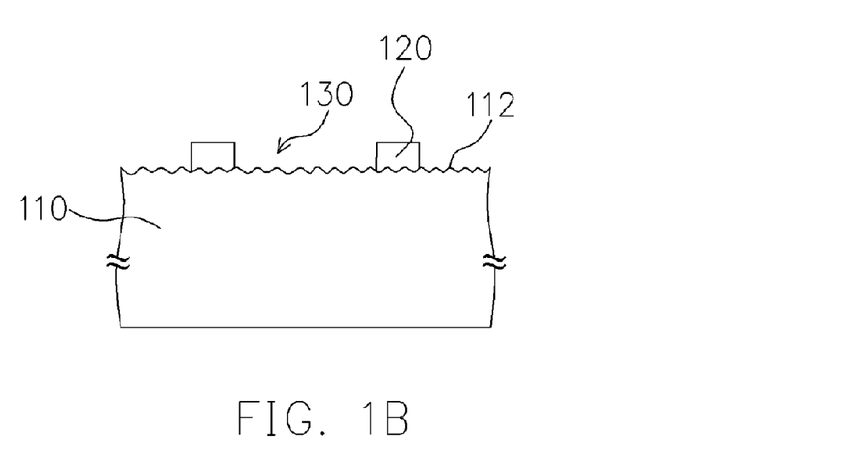
Figure 1C:
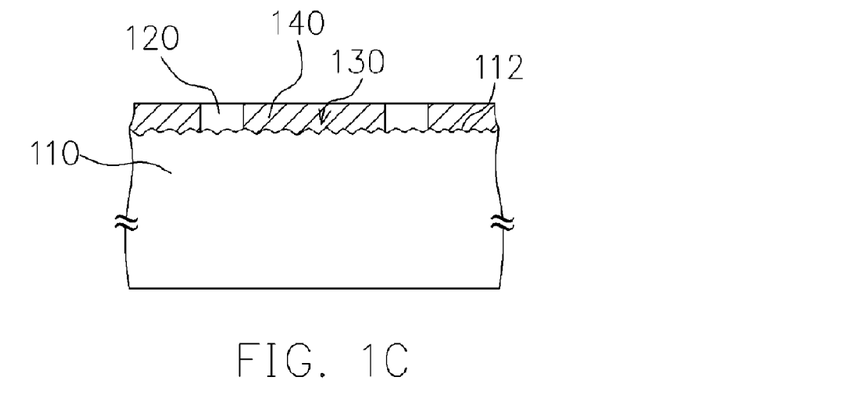

FIGS. 1A, 1B and 1C are schematic cross-sectional views showing the steps of fabricating a color filter substrate according to one embodiment of the present invention. With reference to FIG. 1A, the fabricating method starts by providing a substrate 110 and performing a roughening process on the substrate 110 to make a rough surface 112 on the substrate 110. In an embodiment, the roughening process described above can be a laser process or an etching process.

In FIG. 1B, a black matrix 120 is formed on the substrate 110 to define a plurality of sub-pixel regions 130 on the rough surface 120. In one embodiment, the material of the black matrix 120 can be resin or metal. If the material of the black matrix 120 is resin, the fabricating method of the black matrix 120 will start by distributing a resin layer on the substrate, then exposing and developing the resin layer thereafter. Otherwise, if the material of the black matrix 120 is metal, the fabricating method of the black matrix 120 will then start by forming a metal layer on the substrate, forming a patterned photoresist layer on the metal layer, then etching the metal layer under the mask of the patterned photoresist layer.

With reference to FIG. 1C, a plurality of color filter patterns 140 are formed in each of the sub-pixel regions 130, wherein the color filter patterns 140 touch the rough surface 112 of the substrate 110. Wherein, the color filter patterns 140 can be formed by ink jetting or photolithography. The color filter patterns 140 formed in the sub-pixel regions 130 may include red color filter patterns, green color filter patterns or blue color filter patterns.

Figure 2A:
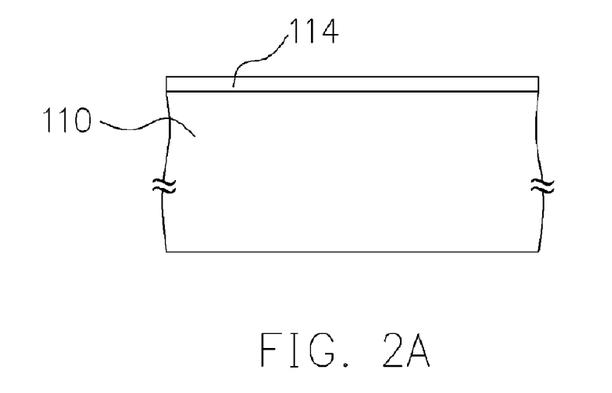
FIGS. 2A, 2B, 2C and 2D are schematic cross-sectional views showing the steps of fabricating a color filter substrate according to another embodiment of the present invention.

In the fabricating method of the color filter substrate described above, the roughening process can be a laser or an etching process. However, the roughening process also can be a punching process. FIGS. 2A, 2B, 2C and 2D are schematic cross-sectional views showing the steps of fabricating a color filter substrate according to another embodiment of the present invention. With reference to FIG. 2A, a buffer layer 114 is formed on the substrate 110 first. Wherein, the buffer layer 114 is a transparent soft coating material, such as vinyl, high-polymer polyvinyl chloride, acrylic resin, or a combination thereof.

Figure 2B:
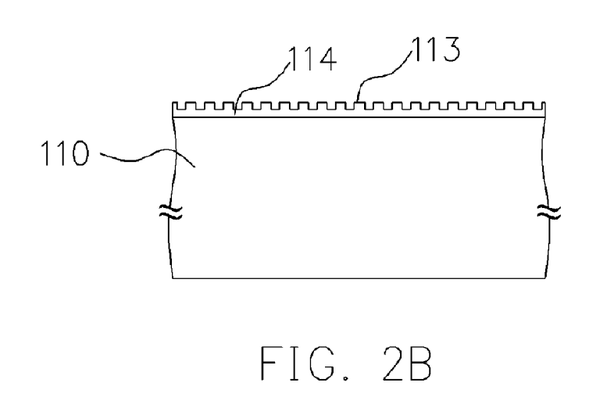

Afterwards, as shown in FIG. 2B, a roughening process is performed on the buffer layer 114 such that the buffer layer 114 has a rough surface 113. In one embodiment, the roughening process described above is performed on the buffer layer 114 by a punching machine. Therefore, the buffer layer 114 has a rough surface 113. The pin used in the punching step described above can be a fine pin with a diameter between 10 micrometer to 15 micrometer. Also, the pin may punch the buffer layer 114 with high velocity, so that the formed apertures will not refract when irradiated by backlight.

Figure 2C:
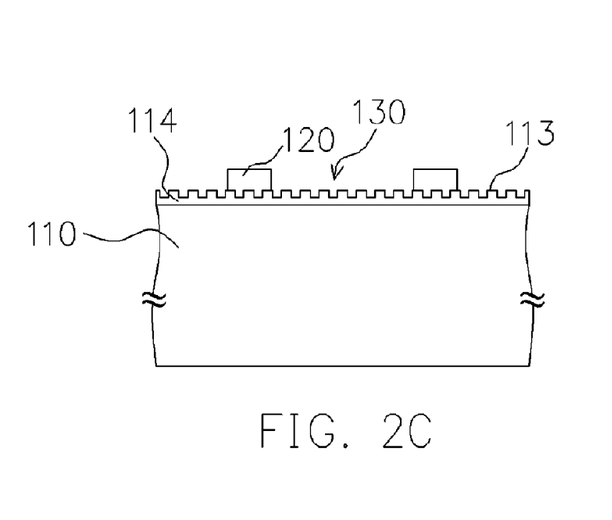
Figure 2D:
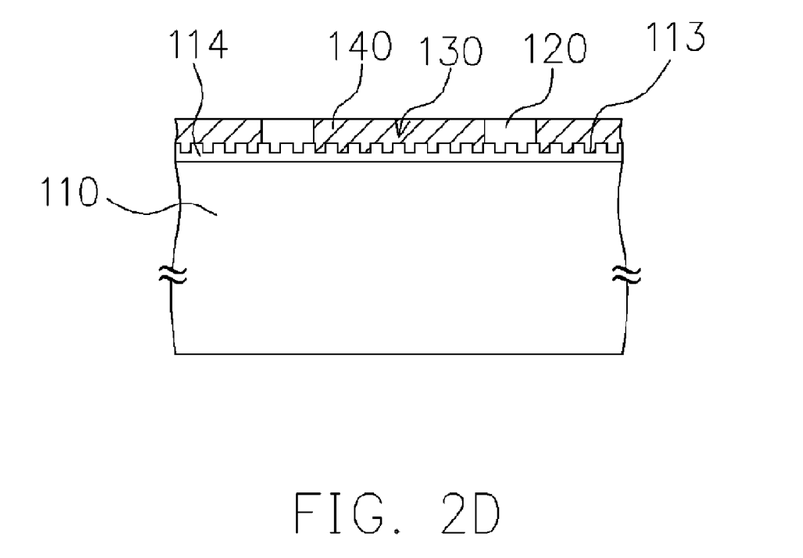

Then, as shown in FIG. 2C, a black matrix 120 is formed on the buffer layer 114 to define a plurality of sub-pixel regions 130 on the rough surface 113. Finally, as shown in FIG. 2D, a plurality of color filter patterns 140 are formed in the sub-pixel regions 130. The forming methods of the black matrix 120 and the color filter patterns 140 are similar to the method described above.

It should be noted that, preferably, the surface energy of the buffer layer 114 may be larger than the surface energy of the color filter patterns 140. For example, the surface energy of the buffer layer 114 is larger than the surface energy of the color filter patterns 140 by 10 (Nt/m) or above, so the adhesion between the color filter pattern 140 and the buffer layer 114 can be better.

The Second Embodiment

Figure 3A:
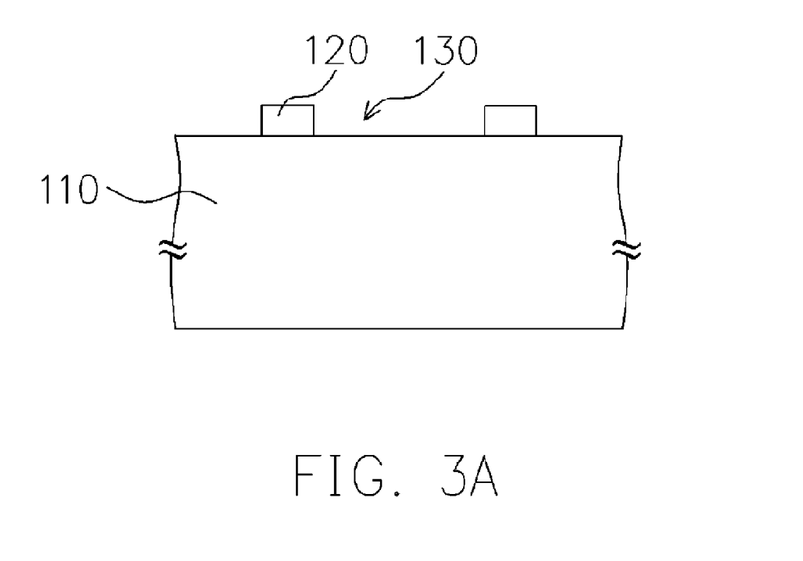
FIGS. 3A, 3B and 3C are schematic cross-sectional views showing the steps of fabricating a color filter substrate according to still another embodiment of the present invention.
Figure 3B:
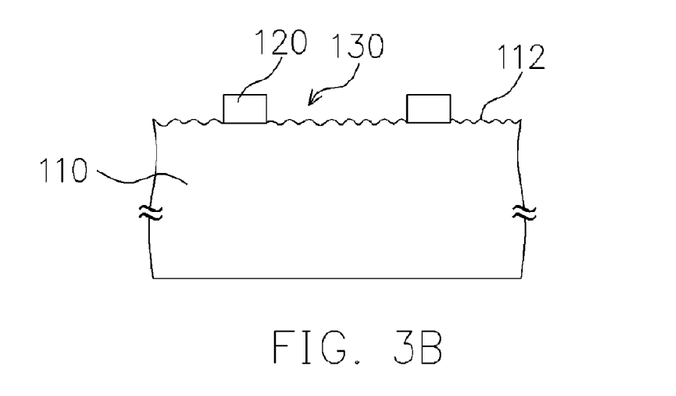
Figure 3C:
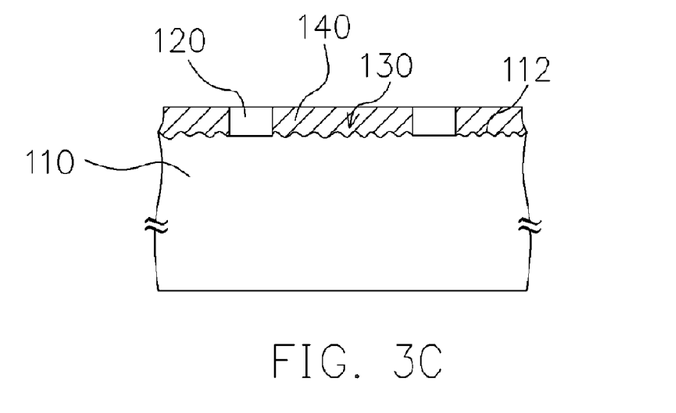

FIGS. 3A, 3B and 3C are schematic cross-sectional views showing the steps of fabricating a color filter substrate according to still another embodiment of the present invention. As shown in FIG. 3A, the other fabricating method of color filter substrate in the present invention start by forming a black matrix 120 on the substrate 110 of the color filter substrate to define a plurality of sub-pixel regions 130 thereon. The forming method of the black matrix 120 is similar to the method described above.

Afterwards, as shown in FIG. 3B, a roughening process is performed on the substrate 110 within the sub-pixel regions 130, such that the buffer layer 114 has a rough surface 113. In one embodiment, the roughening process described above can be a laser process or an etching process.

Finally, as shown in FIG. 3C, a plurality of color filter patterns 140 are formed in the sub-pixel regions 130. Wherein, the forming method of the color filter patterns 140 can be ink jetting or photolithography.

Figure 4A:
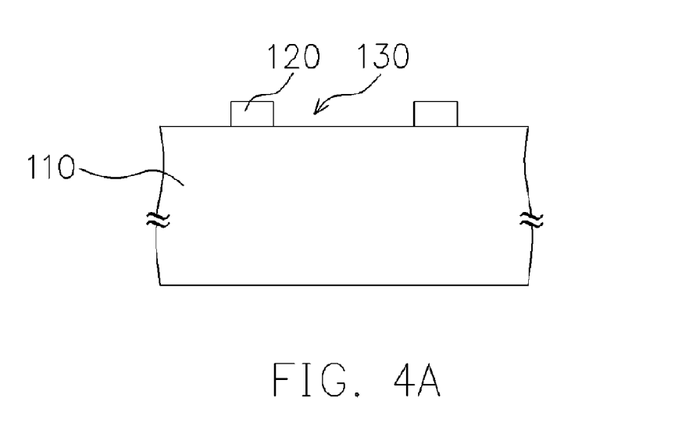
FIGS. 4A, 4B, 4C and 4D are schematic cross-sectional views showing the steps of fabricating a color filter substrate according to yet another embodiment of the present invention.

In the fabricating method of color filter substrate described above, the roughening process can be a laser or an etching process. Likewise, the roughening process also can be a punching process. FIGS. 4A, 4B, 4C and 4D are schematic cross-sectional views showing the steps of fabricating a color filter substrate according to yet another embodiment of the present invention. With reference to FIG. 4A, a black matrix 120 is formed on the substrate 110 of the color filter substrate to define a plurality of sub-pixel regions 130 thereon. The forming method of the black matrix 120 is similar to the method described above.

Figure 4B:
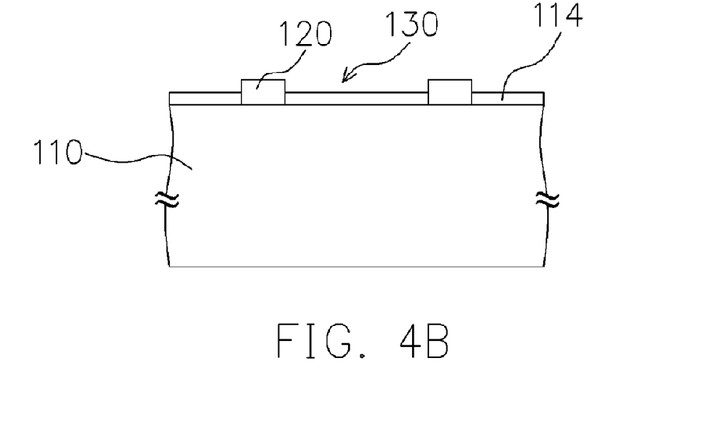

Then, as shown in FIG. 4B, a buffer layer 114 is formed on the substrate 110. Wherein, the buffer layer 114 is a transparent soft coating material such as vinyl, high-polymer polyvinyl chloride, acrylic resin or a combination thereof.

Figure 4C:
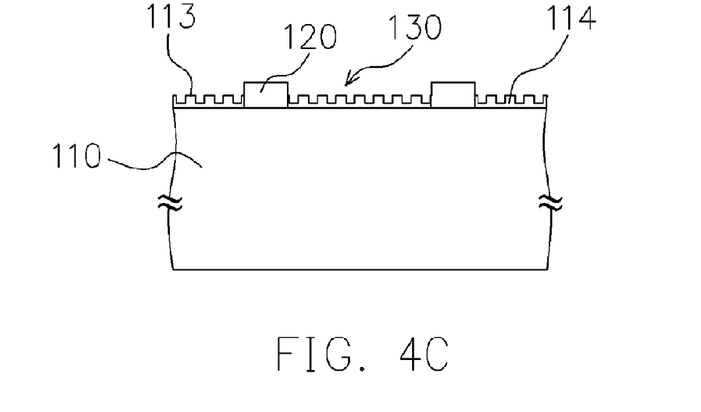

Afterwards, as shown in FIG. 4C, a roughening process is performed on the buffer layer 114, such that the buffer layer 114 has a rough surface 113. In one embodiment, the roughening process described above is performed on the buffer layer 114 by a punching machine. The punching method is similar to the method described above.

Figure 4D:
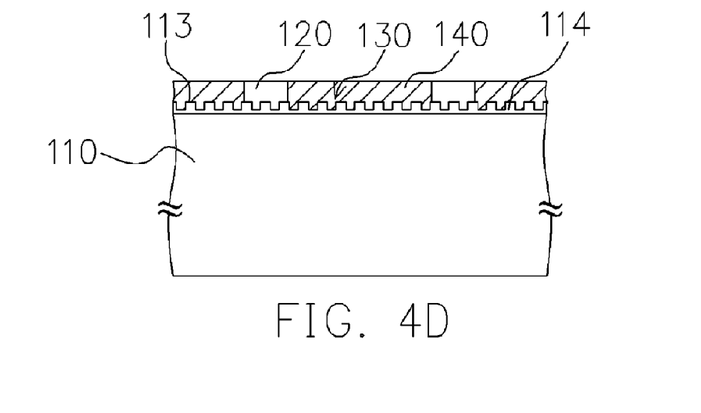

Finally, as shown in FIG. 4D, a plurality of color filter patterns 140 are formed in the sub-pixel regions 130. Wherein, the forming method of the color filter patterns 140 can be ink jetting or photolithography. Preferably, the surface energy of the buffer layer 114 may be larger than the surface energy of the color filter patterns 140. For example, the surface energy of the buffer layer 114 may be larger than the surface energy of the color filter patterns 140 by 10 (Nt/m) or above, such that the adhesion between the color filter pattern 140 and the buffer layer 114 can be better.

Figure 5A:
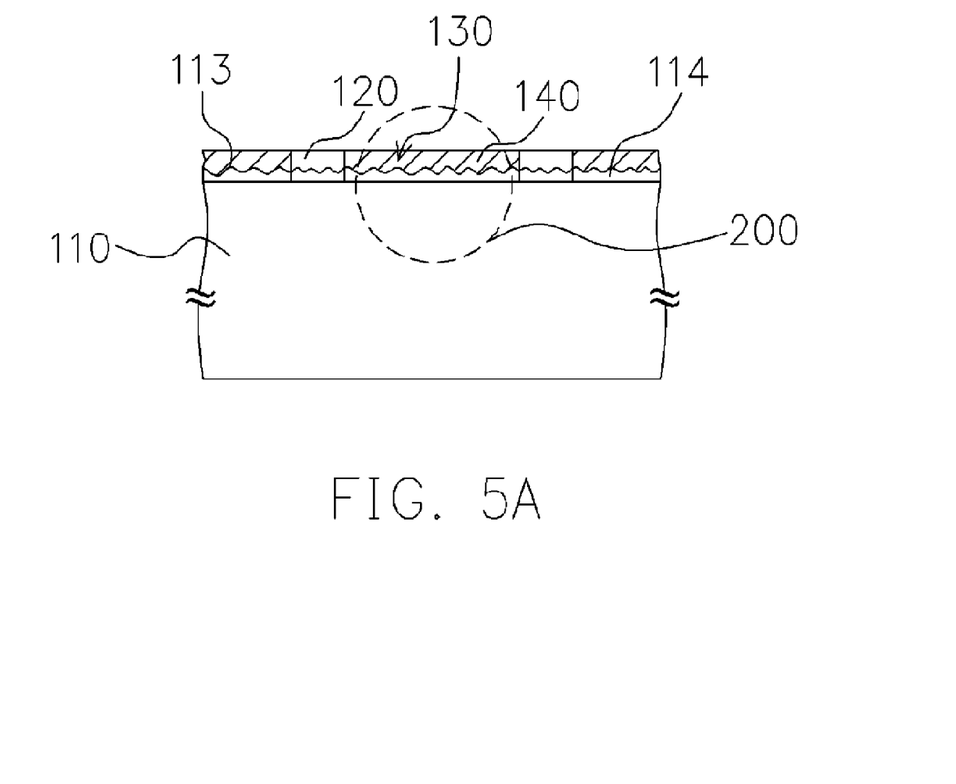
FIG. 5A is a schematic cross-sectional view showing a color filter substrate according to one embodiment of the present invention.
Figure 5B:
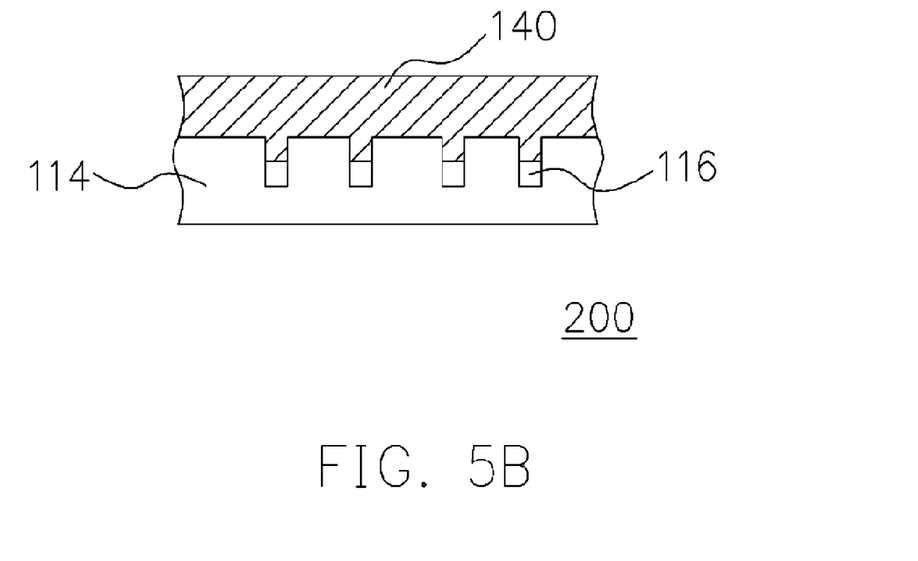
FIG. 5B is an enlarged diagram showing part of the rough surface marked 200 in FIG. 5A.

With the methods provided in the two embodiments described above, the color filter substrate having better adhesive property between the color filter pattern on the color filter substrate and the substrate within the sub-pixel regions can be provided. Particularly, if the rough surface is formed by punching, the partial enlarged diagram of the color filter substrate is shown in FIGS. 5A and 5B. FIG. 5A is a schematic cross-sectional view showing a color filter substrate according to one embodiment of the present invention, and FIG. 5B is an enlarged diagram showing the part marked 200 in FIG. 5A. The color filter substrate essentially comprises a substrate 110, a black matrix 120 and a plurality of color filter patterns 140. Wherein, a buffer layer 114 with a rough surface 113 is further disposed on the substrate 110. The black matrix 120 is disposed on the substrate 110 to define a plurality of sub-pixel regions 130. Moreover, the color filter patterns 140 are disposed within the sub-pixel regions 130 and touch the rough surface 113. Owing to the capillarity between the color filter patterns 140 and the apertures 116 of the buffer layer 114, the color filter patterns 140 can be firmly attached to the buffer layer 114. Consequently, the adhesion between the color filter pattern 140 and the substrate 110 can be enhanced. In detail, because the color filter patterns 140 is dragged into the apertures 116 of the buffer layer 114 due to capillarity, the contacting area between the color filter patterns 140 and the rough surface 113 within the sub-pixel regions 130 will be increased. Therefore, the adhesion between the color filter pattern 140 and the substrate 110 can be improved.

Figure 6A:
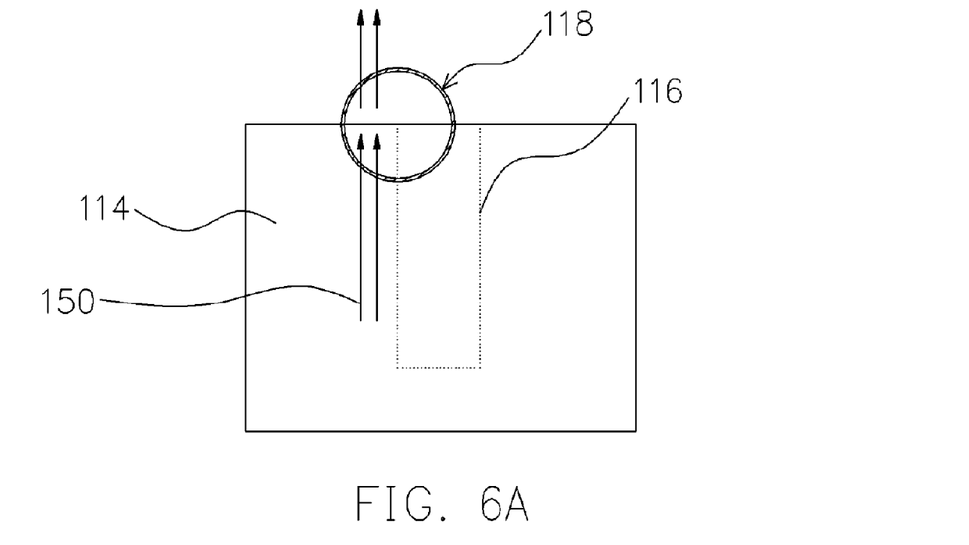
FIGS. 6A and 6B are enlarged diagrams showing the rough surfaces according to one embodiment of the present invention.
Figure 6B:
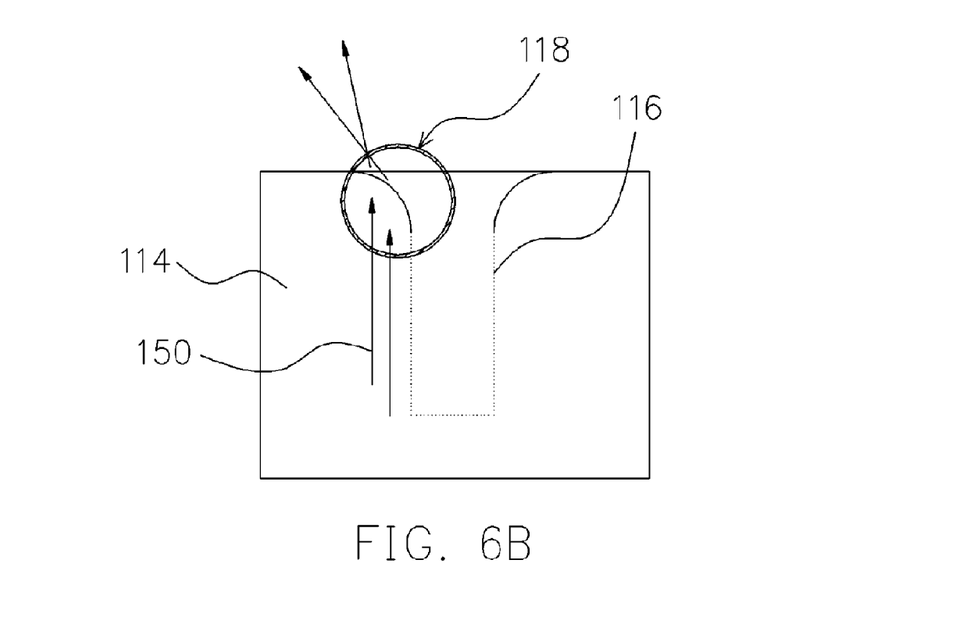

In the punching step described in the two embodiments mentioned above, the shape of the formed apertures is dependent on the diameter and the punching velocity of the pin. FIGS. 6A and 6B are enlarged diagrams showing the rough surfaces according to one embodiment of the present invention. As shown in FIG. 6A, when the diameter of the pin is small enough, and the punching velocity of the pin is fast enough, the shape of the cross-section in the rims 118 of the formed apertures will be a right angle. Therefore, the light 150 irradiated by back light will not refract in various directions. On the other hand, as shown in FIG. 6B, when the diameter of the pin is large, and the punching velocity of the pin is slow, the shape of the cross-section in the rims 118 of the formed apertures will be a curve. Therefore, the light 150 irradiated by back light will refract in various directions. Consequently, to avoid refraction while irradiated by the back light and to have a better shape of the cross-section in the rim of the formed aperture, a pin with smaller diameter and faster punching velocity is preferred in the punching step described in the two embodiments mentioned above. However, in some situations, the pin with larger diameter and slower punching velocity can be used in the punching step for a fuzzy effect so the light will refract in various directions when irradiated by the back light.

In conclusion, a rough surface is used in the color filter substrate and a fabricating method thereof in the present invention to increase the contacting area between the color filter pattern and the substrate. Consequently, the adhesion between the color filter pattern and the substrate within the sub-pixel regions can be enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fabricating method of color filter substrate, comprising the steps of:
   forming a buffer layer on a substrate;
   performing a roughening process to make a rough surface on the buffer layer;
   forming a black matrix on the substrate to define a plurality of sub-pixel regions on the rough surface; and
   forming a color filter pattern in each of the sub-pixel regions, wherein the surface energy of the buffer layer is larger than the surface energy of the color filter patterns.

2. The fabricating method of color filter substrate according to claim 1, wherein the material of the buffer layer is vinyl, high-polymer polyvinyl chloride, acrylic resin or a combination thereof.

3. The fabricating method of color filter substrate according to claim 1, wherein the roughening process includes a punching process.

4. The fabricating method of color filter substrate according to claim 3, wherein a diameter of a pin used in the punching process is between 10 micrometer to 15 micrometer.

5. A fabricating method of color filter substrate, comprising the steps of:
   performing a roughening process on a substrate to make a rough surface on the substrate, wherein the roughening process includes a laser process;
   forming a black matrix on the substrate to define a plurality of sub-pixel regions on the rough surface; and
   forming a color filter pattern in each of the sub-pixel regions.

6. A fabricating method of color filter substrate, comprising the steps of:
   forming a black matrix on a substrate to define a plurality of sub-pixel regions on the substrate;
   performing a roughening process in the sub-pixel regions of the substrate, wherein a buffer layer is further formed on the substrate before forming the black matrix or performing the roughening process; and
   forming a color filter pattern in each of the sub-pixel regions.

7. The fabricating method of color filter substrate according to claim 6, wherein the surface energy of the buffer layer is larger than the surface energy of the color filter patterns.

8. The fabricating method of color filter substrate according to claim 6, wherein the material of the buffer layer is vinyl, high-polymer polyvinyl chloride, acrylic resin, or a combination thereof.

9. The fabricating method of color filter substrate according to claim 6, wherein the roughening process includes a punching process.

10. The fabricating method of color filter substrate according to claim 9, wherein a diameter of a pin used in the punching process is between 10 micrometer to 15 micrometer.

11. A fabricating method of color filter substrate, comprising the steps of:
    forming a black matrix on a substrate to define a plurality of sub-pixel regions on the substrate;
    performing a roughening process in the sub-pixel regions of the substrate, wherein the roughening process includes a laser process; and
    forming a color filter pattern in each of the sub-pixel regions.

12. A color filter substrate, comprising:
    a substrate;
    a buffer layer disposed on the substrate, wherein the buffer layer has a rough surface;
    a black matrix which is disposed on the buffer layer to define a plurality of sub-pixel regions; and
    a plurality of color filter patterns which are disposed in the sub-pixel regions respectively and touch the rough surface of the buffer layer, wherein the surface energy of the buffer layer is larger than the surface energy of the color filter patterns.

13. The color filter substrate according to claim 12, wherein the surface energy of the buffer layer is larger than the surface energy of the color filter patterns by 10 (Nt/m) or above.

* * * * *